US009684405B2

(12) United States Patent
Landau

(10) Patent No.: US 9,684,405 B2
(45) Date of Patent: Jun. 20, 2017

(54) SYSTEM AND METHOD FOR CYCLIC MOTION GESTURE

(71) Applicant: Rakuten Kobo, Inc., Toronto (CA)

(72) Inventor: Benjamin Landau, Toronto (CA)

(73) Assignee: Rakuten Kobo, Inc., Toronto (CA)

( * ) Notice: Subject to any disclaimer, the term of this patent is extended or adjusted under 35 U.S.C. 154(b) by 234 days.

(21) Appl. No.: 14/539,947

(22) Filed: Nov. 12, 2014

(65) Prior Publication Data

US 2016/0132169 A1    May 12, 2016

(51) Int. Cl.
*G06F 3/041* (2006.01)
*G06F 3/01* (2006.01)
*G06F 3/0487* (2013.01)
*G06F 1/16* (2006.01)
*G06F 3/0483* (2013.01)

(52) U.S. Cl.
CPC .......... *G06F 3/0416* (2013.01); *G06F 1/1694* (2013.01); *G06F 3/017* (2013.01); *G06F 3/0483* (2013.01); *G06F 3/0487* (2013.01); *G09G 2380/14* (2013.01)

(58) Field of Classification Search
CPC ...... G06F 1/1694; G06F 3/017; G06F 3/0416; G06F 3/0483; G06F 3/0487; G09G 2380/14
USPC ................................................. 345/156–184
See application file for complete search history.

(56) References Cited

U.S. PATENT DOCUMENTS

| | | | | |
|---|---|---|---|---|
| 8,994,646 | B2 * | 3/2015 | Hinckley | G06F 1/1694 345/156 |
| 2009/0262074 | A1 * | 10/2009 | Nasiri | A63F 13/06 345/158 |
| 2009/0265671 | A1 * | 10/2009 | Sachs | G06F 3/017 715/863 |
| 2009/0303204 | A1 * | 12/2009 | Nasiri | A63F 13/06 345/184 |
| 2012/0260220 | A1 * | 10/2012 | Griffin | G06F 3/033 715/863 |
| 2013/0285933 | A1 * | 10/2013 | Sim | G06F 3/04883 345/173 |
| 2014/0160078 | A1 * | 6/2014 | Seo | G06F 3/017 345/175 |

\* cited by examiner

*Primary Examiner* — Dmitriy Bolotin
(74) *Attorney, Agent, or Firm* — Oblon, McClelland, Maier & Neustadt, L.L.P.

(57) ABSTRACT

A method and system for cyclic motion gesturing is provided. The method includes receiving at a motion sensor coupled with a processor a first motion associated with an e-reader, receiving a second motion associated with an e-reader at the motion sensor, the second motion being a counter motion of the first motion, wherein the first and second motions are associated with moving the e-reader form a first point in space to a second point in space and then back to the first point in space within a predetermined period of time, determining the first and second motions indicate a multi-motion command gesture corresponding to a first function performable on the e-Reader and automatically performing the first function on the e-reader in response to the multi-motion command gesture.

24 Claims, 5 Drawing Sheets

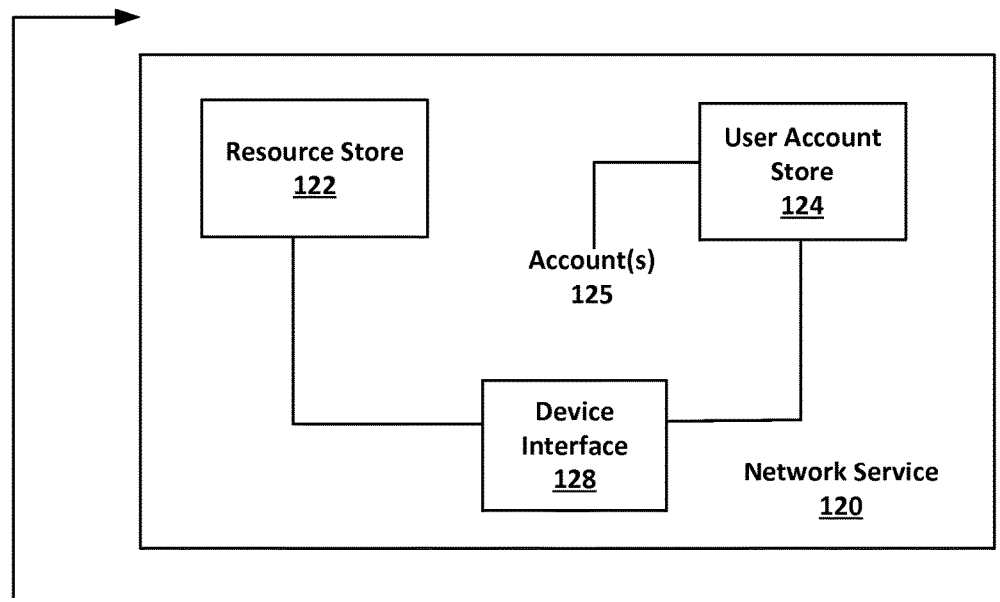
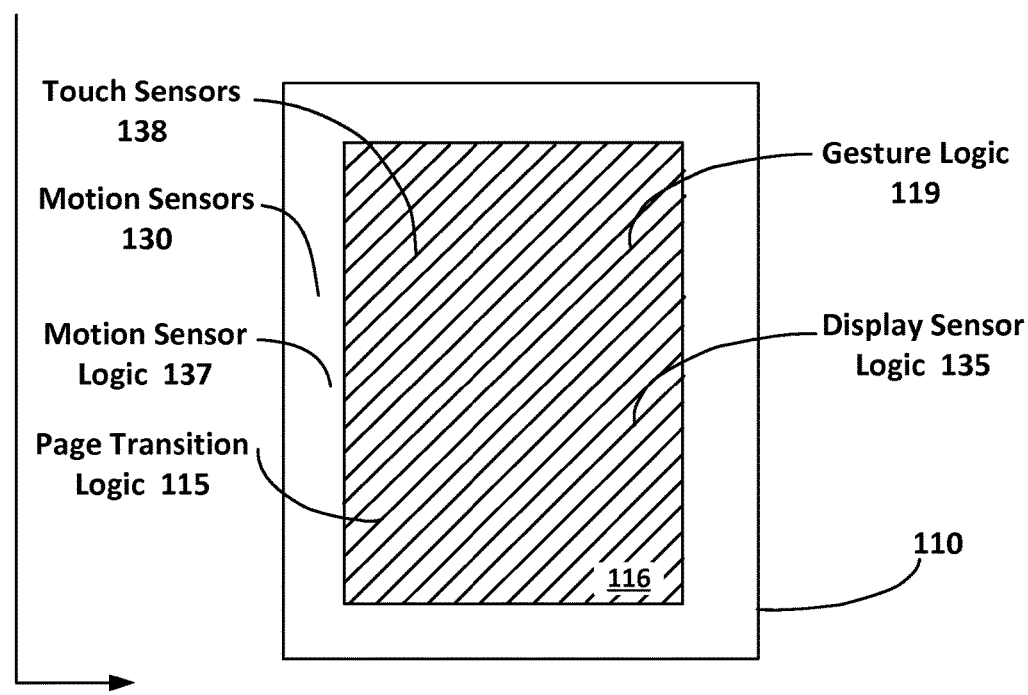
FIG. 1

400

```
┌─────────────────────────────────────────────────────────────┐
│  RECEIVING AT A MOTION SENSOR COUPLED WITH A PROCESSOR A FIRST │
│           MOTION ASSOCIATED WITH AN E-READER                │
│                            402                              │
└─────────────────────────────────────────────────────────────┘
                              │
                              ▼
┌─────────────────────────────────────────────────────────────┐
│   RECEIVING A SECOND MOTION ASSOCIATED WITH AN E-READER AT THE │
│  MOTION SENSOR, THE SECOND MOTION BEING A COUNTER MOTION OF THE│
│    FIRST MOTION, WHEREIN THE FIRST AND SECOND MOTIONS ARE    │
│  ASSOCIATED WITH MOVING THE E-READER FROM A FIRST POINT IN SPACE│
│ TO A SECOND POINT IN SPACE TO A THIRD POINT IN SPACE AND THEN BACK│
│  TO THE FIRST POINT IN SPACE WITHIN A PREDETERMINED PERIOD OF TIME│
│                            404                              │
└─────────────────────────────────────────────────────────────┘
                              │
                              ▼
┌─────────────────────────────────────────────────────────────┐
│      DETERMINING THE FIRST AND SECOND MOTIONS INDICATE A MULTI-│
│   MOTION COMMAND GESTURE CORRESPONDING TO A FIRST FUNCTION  │
│              PERFORMABLE ON THE E-READER                    │
│                            406                              │
└─────────────────────────────────────────────────────────────┘
                              │
                              ▼
┌─────────────────────────────────────────────────────────────┐
│        AUTOMATICALLY PERFORMING THE FIRST FUNCTION ON THE   │
│   E-READER IN RESPONSE TO THE MULTI-MOTION COMMAND GESTURE  │
│                            408                              │
└─────────────────────────────────────────────────────────────┘
```

FIG. 4

SYSTEM AND METHOD FOR CYCLIC MOTION GESTURE

TECHNICAL FIELD

Examples described herein relate to a system and method for operating a computing device in exception to a suspend mode pertaining to touch screen display functionality of the device.

BACKGROUND

An electronic personal display is a mobile computing device that displays information to a user. While an electronic personal display may be capable of many of the functions of a personal computer, a user can typically interact directly with an electronic personal display without the use of a keyboard that is separate from, or coupled to, but distinct from the electronic personal display itself. Some examples of electronic personal displays include mobile digital devices/tablet computers and electronic readers (e-readers) such (e.g., Apple iPad®, Microsoft® Surface™, Samsung Galaxy Tab® and the like), handheld multimedia smartphones (e.g., Apple iPhone®, Samsung Galaxy S®, and the like), and handheld electronic readers (e.g., Amazon Kindle®, Barnes and Noble Nook®, Kobo Aura HD, Kobo Aura H2O, Kobo GLO and the like).

Some electronic personal display devices are purpose built devices designed to perform especially well at displaying digitally stored content for reading or viewing thereon. For example, a purpose build device may include a display that reduces glare, performs well in high lighting conditions, and/or mimics the look of text as presented via actual discrete pages of paper. While such purpose built devices may excel at displaying content for a user to read, they may also perform other functions, such as displaying images, emitting audio, recording audio, and web surfing, among others.

Electronic personal displays are among numerous kinds of consumer devices that can receive services and utilize resources across a network service. Such devices can operate applications or provide other functionality that links a device to a particular account of a specific service. For example, the electronic reader (e-reader) devices typically link to an online bookstore, and media playback devices often include applications that enable the user to access an online media electronic library (or e-library). In this context, the user accounts can enable the user to receive the full benefit and functionality of the device.

Yet further, such devices may incorporate a touch screen display having integrated touch sensors and touch sensing functionality, whereby user input commands via touch-based gestures are received thereon.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawings should not be understood as being drawn to scale unless specifically noted.

FIG. 1 illustrates a system utilizing applications and providing e-book services on a computing device configured for motion gesture, in an embodiment.

FIG. 4 illustrates a method of operating a computing device for motion gesture, according to an embodiment.

DETAILED DESCRIPTION

Figure 2:
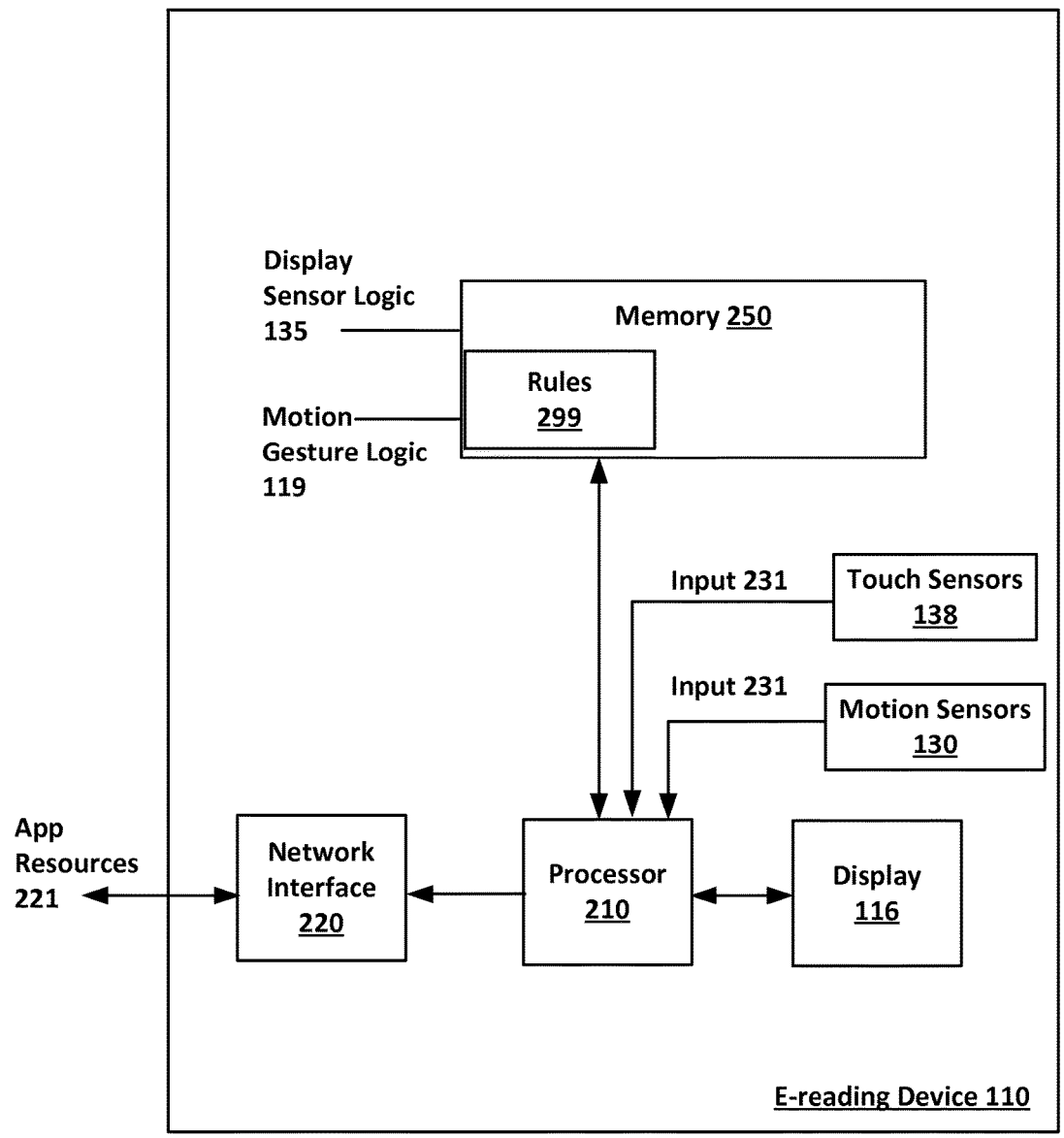
FIG. 2 illustrates an example architecture configuration of a computing device configured for motion gesture, according to an embodiment.

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the various embodiments as defined by the appended claims. Furthermore, in the Description of Embodiments, numerous specific details are set forth in order to provide a thorough understanding of embodiments of the present subject matter. However, embodiments may be practiced without these specific details. In other instances, well known methods, procedures, components, and circuits have not been described in detail as not to unnecessarily obscure aspects of the described embodiments.

NOTATION AND NOMENCLATURE

Unless specifically stated otherwise as apparent from the following discussions, it is appreciated that throughout the present Description of Embodiments, discussions utilizing terms such as "receiving", "accessing", "directing", "storing", "disabling", "suspending", or the like, often refer to the actions and processes of an electronic computing device/system, such as an electronic reader ("eReader"), electronic personal display, and/or a mobile (i.e., handheld) multimedia device, among others. The electronic computing device/system manipulates and transforms data represented as physical (electronic) quantities within the circuits, electronic registers, memories, logic, and/or components and the like of the electronic computing device/system into other data similarly represented as physical quantities within the electronic computing device/system or other electronic computing devices/systems.

In one embodiment, an e-Reader device is configured with integrated motion sensors (accelerometer(s), etc.) to detect direction & rate of motion. The return motion is an integral part of the gesture, used in order to filter out or minimize potential "false-page-turn" trigger signals such as when the user might simply switch hands for reading, put down the device, etc.

Performing a return gesture once (e.g. a single shake up and down) can take readers from any in-book setting window (i.e. notation pop-up window, search pop-up window, highlighted text options) back to their reading experience mode, in which they were immersed before the diversion that got them out of the in-book setting.

"E-books" are a form of electronic publication content stored in digital format in a computer non-transitory memory, viewable on a computing device with suitable functionality. An e-book can correspond to, or mimic, the paginated format of a printed publication for viewing, such as provided by printed literary works (e.g., novels) and periodicals (e.g., magazines, comic books, journals, etc.). Optionally, some e-books may have chapter designations, as well as content that corresponds to graphics or images (e.g., such as in the case of magazines or comic books). Multi-function devices, such as cellular-telephony or messaging devices, can utilize specialized applications (e.g., specialized e-reading application software) to view e-books in a format that mimics the paginated printed publication. Still further, some devices (sometimes labeled as "e-readers") can display digitally-stored content in a more reading-centric manner, while also providing, via a user input interface, the ability to manipulate that content for viewing, such as via discrete successive pages.

An "e-reading device," also referred to herein as an electronic personal display, can refer to any computing device that can display or otherwise render an e-book. By way of example, an e-reading device can include a mobile computing device on which an e-reading application can be executed to render content that includes e-books (e.g., comic books, magazines, etc.). Such mobile computing devices can include, for example, a multi-functional computing device for cellular telephony/messaging (e.g., feature phone or smart phone), a tablet computer device, an ultramobile computing device, or a wearable computing device with a form factor of a wearable accessory device (e.g., smart watch or bracelet, glasswear integrated with a computing device, etc.). As another example, an e-reading device can include an e-reader device, such as a purpose-built device that is optimized for an e-reading experience (e.g., with E-ink displays).

One or more embodiments described herein provide that methods, techniques and actions performed by a computing device are performed programmatically, or as a computer-implemented method. Programmatically means through the use of code or computer-executable instructions. A programmatically performed step may or may not be automatic. For example, in one or more embodiments, a summary mode is provided that can be used in various ways to store and display pertinent book content or reader notes. The summary mode can be used by the reader to refresh recollection of various aspects of the book and to remind the reader of highlighted portions of the text that the user had found especially important.

One or more embodiments described herein may be implemented using programmatic modules or components. A programmatic module or component may include a program, a subroutine, a portion of a program, or software or a hardware component capable of performing one or more stated tasks or functions. As used herein, a module or component can exist on a hardware component independently of other modules or components. Alternatively, a module or component can be a shared element or process of other modules, programs or machines.

Furthermore, one or more embodiments described herein may be implemented through instructions that are executable by one or more processors. These instructions may be carried on a computer-readable medium. Machines shown or described with figures below provide examples of processing resources and computer-readable mediums on which instructions for implementing embodiments described can be carried and/or executed. In particular, the numerous machines shown may include processor(s) and various forms of memory for holding data and instructions. Examples of computer-readable mediums include permanent memory storage devices, such as hard drives on personal computers or servers. Other examples of computer storage mediums include portable storage units, such as CD or DVD units, flash or solid state memory (such as carried on many cell phones and consumer electronic devices) and magnetic memory. Computers, terminals, network enabled devices (e.g., mobile devices such as cell phones) are all examples of machines and devices that utilize processors, memory, and instructions stored on computer-readable mediums. Additionally, embodiments may be implemented in the form of computer programs, or a computer usable carrier medium capable of carrying such a program.

System and Hardware Description

FIGS. 1 and 2 illustrate a system 100 for utilizing applications and providing e-book services on a computing device, according to an embodiment. In an example of FIG. 1, system 100 includes an electronic personal display device, shown by way of example as an e-reading device 110, and a network service 120. The network service 120 can include multiple servers and other computing resources that provide various services in connection with one or more applications that are installed on the e-reading device 110.

By way of example, in one embodiment, the network service 120 can provide e-book services which communicate with the e-reading device 110. The e-book services provided through network service 120 can, for example, include services in which e-books are sold, shared, downloaded and/or stored. More generally, the network service 120 can provide various other content services, including content rendering services (e.g., streaming media) or other network-application environments or services.

The e-reading device 110 can correspond to any electronic personal display device on which applications and application resources (e.g., e-books, media files, documents) can be rendered and consumed. For example, the e-reading device 110 can correspond to a tablet or telephony/messaging device (e.g., smart phone). In one implementation, for example, e-reading device 110 can run an e-reader application that links the device to the network service 120 and enables e-books provided through the service to be viewed and consumed.

In another implementation, the e-reading device 110 can run a media playback or streaming application that receives files or streaming data from the network service 120. By way of example, the e-reading device 110 can be equipped with hardware and software to optimize certain application activities, such as reading electronic content (e.g., e-books). For example, the e-reading device 110 can have a tablet-like form factor, although variations are possible. In some cases, the e-reading device 110 can also have an E-ink display.

In additional detail, the network service 120 can include a device interface 128, a resource store 122 and a user account store 124. The user account store 124 can associate the e-reading device 110 with a user and with an account 125. The account 125 can also be associated with one or more application resources (e.g., e-books), which can be stored in the resource store 122. The device interface 128 can handle requests from the e-reading device 110, and further interface the requests of the device with services and functionality of the network service 120.

The device interface 128 can utilize information provided with a user account 125 in order to enable services, such as purchasing downloads or determining what e-books and content items are associated with the user device. Additionally, the device interface 128 can provide the e-reading device 110 with access to the content store 122, which can include, for example, an online store. The device interface 128 can handle input to identify content items (e.g., e-books), and further to link content items to the account 125 of the user.

As described further, the user account store 124 can retain metadata for individual accounts 125 to identify resources that have been purchased or made available for consumption for a given account. The e-reading device 110 may be associated with the user account 125, and multiple devices may be associated with the same account. As described in greater detail below, the e-reading device 110 can store resources (e.g., e-books) that are purchased or otherwise made available to the user of the e-reading device 110, as well as to archive e-books and other digital content items that have been purchased for the user account 125, but are not stored on the particular computing device.

With reference to an example of FIG. 1, e-reading device 110 can include a display screen 116. In an embodiment, the display screen 116 is touch-sensitive, to process touch inputs including gestures (e.g., swipes). For example, the display screen 116 may be integrated with one or more touch sensors 138 to provide a touch sensing region on a surface of the display screen 116. For some embodiments, the one or more touch sensors 138 may include capacitive sensors that can sense or detect a human body's capacitance as input. In the example of FIG. 1, the touch sensing region coincides with a substantial surface area, if not all, of the display screen 116. Additionally, a housing can also be integrated with touch sensors to provide one or more touch sensing regions, for example, on the bezel and/or back surface of the housing.

In some embodiments, the e-reading device 110 includes features for providing functionality related to displaying paginated content. The e-reading device 110 can include page transitioning logic 115, which enables the user to transition through paginated content. The e-reading device 110 can display pages from e-books, and enable the user to transition from one page state to another. In particular, an e-book can provide content that is rendered sequentially in pages, and the e-book can display page states in the form of single pages, multiple pages or portions thereof. Accordingly, a given page state can coincide with, for example, a single page, or two or more pages displayed at once. The page transitioning logic 115 can operate to enable the user to transition from a given page state to another page state. In some implementations, the page transitioning logic 115 enables single page transitions, chapter transitions, or cluster transitions (multiple pages at one time).

The page transitioning logic 115 can be responsive to various kinds of interfaces and actions in order to enable page transitioning. In one implementation, the user can signal a page transition event to transition page states by, for example, interacting with the touch sensing region of the display screen 116. For example, the user may swipe the surface of the display screen 116 in a particular direction (e.g., up, down, left, or right) to indicate a sequential direction of a page transition. In variations, the user can specify different kinds of page transitioning input (e.g., single page turns, multiple page turns, chapter turns, etc.) through different kinds of input. Additionally, the page turn input of the user can be provided with a magnitude to indicate a magnitude (e.g., number of pages) in the transition of the page state. For example, a user can touch and hold the surface of the display screen 116 in order to cause a cluster or chapter page state transition, while a tap in the same region can effect a single page state transition (e.g., from one page to the next in sequence). In another example, a user can specify page turns of different kinds or magnitudes through single taps, sequenced taps or patterned taps on the touch sensing region of the display screen 116.

E-reading device 110 can also include one or more motion sensors 130 arranged to detect motion imparted thereto, such as by a user while reading or in accessing associated functionality. In general, the motion sensor(s) 130 may be selected from one or more of a number of motion recognition sensors, such as but not limited to, an accelerometer, a magnetometer, a gyroscope and a camera. Further still, motion sensor 130 may incorporate or apply some combination of the latter motion recognition sensors. The touch sensors 130 enable a user to provide motion gestures to operate the device 110. For example, jiggles, shakes, rotations, etc. can be used to control one or more function of device 110. In one embodiment, a user can set rules for motion gesture sequences that will automatically perform functions when detected.

In an accelerometer-based embodiment of motion sensor 135, when an accelerometer experiences acceleration, a mass is displaced to the point that a spring is able to accelerate the mass at the same rate as the casing. The displacement is then measured thereby determining the acceleration. In one embodiment, piezoelectric, piezoresistive and capacitive components are used to convert the mechanical motion into an electrical signal. For example, piezoelectric accelerometers are useful for upper frequency and high temperature ranges. In contrast, piezoresistive accelerometers are valuable in higher shock applications. Capacitive accelerometers use a silicon micro-machined sensing element and perform well in low frequency ranges. In another embodiment, the accelerometer may be a micro electro-mechanical systems (MEMS) consisting of a cantilever beam with a seismic mass.

In an alternate embodiment of motion sensor 130, a magnetometer, such as a magnetoresistive permalloy sensor can be used as a compass. For example, using a three-axis magnetometer allows a detection of a change in direction regardless of the way the device is oriented. That is, the three-axis magnetometer is not sensitive to the way it is oriented as it will provide a compass type heading regardless of the device's orientation.

In another embodiment of motion sensor 130, a gyroscope measures or maintains orientation based on the principles of angular momentum. In one embodiment, the combination of a gyroscope and an accelerometer comprising motion sensor 135 provides more robust direction and motion sensing.

In yet another embodiment of motion sensor 130, a camera can be used to provide egomotion, e.g., recognition of the 3D motion of the camera based on changes in the images captured by the camera. In one embodiment, the process of estimating a camera's motion within an environment involves the use of visual odometry techniques on a sequence of images captured by the moving camera. In one embodiment, it is done using feature detection to construct an optical flow from two image frames in a sequence.

For example, features are detected in the first frame, and then matched in the second frame. The information is then used to make the optical flow field showing features diverging from a single point, e.g., the focus of expansion. The focus of expansion indicates the direction of the motion of the camera. Other methods of extracting egomotion information from images, method that avoid feature detection and optical flow fields are also contemplated. Such methods include using the image intensities for comparison and the like.

In one implementation, the user can signal a page transition event to transition page states by, for example, by moving the device is a cyclical movement. For example, the user may move the display screen 116 in a particular direction (e.g., up, down, left, or right) to indicate a sequential direction of a page transition. In variations, the user can specify different kinds of page transitioning input (e.g., single page turns, multiple page turns, chapter turns, etc.) through different kinds of input. In one embodiment, a simple cyclical movement may be used to provide a gesture input to device 110 and the motion gesture may cause the device 110 to automatically perform a function. For example, in one embodiment, a simple shaking motion may be used as a "back" command.

The device 110 is configured with integrated motion sensors 130 (accelerometer(s), etc.) to detect direction & rate of motion. The return motion is an integral part of the gesture, used in order to filter out or minimize potential "false-page-turn" trigger signals such as when the user might simply switch hands for reading, put down the device, etc.

Performing a return gesture once (e.g. a single shake up and down) can take readers from any in-book setting window (i.e. notation pop-up window, search pop-up window, highlighted text options) back to their reading experience mode, in which they were immersed before the diversion that got them out of the in-book setting.

Unlike pressing the "X" button, or selecting a "back" button, a multi-motion command gesture will allow users to adjust their reading experience with a simple, fun, and time saving one-handed gesture.

This functionality may be of particular use to those who are disabled or are multitasking. It lets the reader conveniently revert to an active e-reading experience once a diversion or digression is fulfilled.

Other reasons for digression while e-reading may to record and file an annotation, to transact an e-book purchase or browse a synopsis or review of a book or other e-publication offered or referred to in the content being read, etc.

The cyclic motion is intuitive, allowing the serious reader, previously immersed in their reading experience prior to the diversion, to seemingly "shake out" the diversion in an easily via a concise cyclic motion.

"Cyclic" as used herein does not necessarily mean circular, but rather means a motion integrally followed by its counter-motion; a flick integrated with a counter-flick, or a shake being a motion integrated with a corresponding return motion.

According to some embodiments shown in FIG. 2, the e-reading device 110 includes display sensor logic 135 to detect and interpret user input or user input commands made through interaction with the touch sensors 138 and motion sensors 130. By way of example, the display sensor logic 135 can detect a user making contact with the touch sensing region of the display screen 116 and can detect a user moving the device and causing the motion sensors 130 to provide motion information to display logic 135. More specifically, the display sensor logic 135 can detect taps, an initial tap held in sustained contact or proximity with display screen 116 (otherwise known as a "long press"), multiple taps, and/or swiping gesture actions made through user interaction with the touch sensing region of the display screen 116. Furthermore, the display sensor logic 135 can interpret such interactions in a variety of ways. For example, each interaction may be interpreted as a particular type of user input corresponding with a change in state of the display 116.

For some embodiments, the display sensor logic 135 may further detect the presence of water, dirt, debris, and/or other extraneous objects on the surface of the display 116. For example, the display sensor logic 135 may be integrated with a water-sensitive switch (e.g., such as an optical rain sensor) to detect an accumulation of water on the surface of the display 116. In a particular embodiment, the display sensor logic 135 may interpret simultaneous contact with multiple touch sensors 138 as a type of non-user input. For example, the multi-sensor contact may be provided, in part, by water and/or other unwanted or extraneous objects (e.g., dirt, debris, etc.) interacting with the touch sensors 138. Specifically, the e-reading device 110 may then determine, based on the multi-sensor contact, that at least a portion of the multi-sensor contact is attributable to presence of water and/or other extraneous objects on the surface of the display 116.

E-reading device 110 further includes motion gesture logic 137 to interpret user input motions as commands based on detection of the input motions by motion sensor(s) 130. For example, input motions performed on e-reading device 110 such as a tilt, a shake, a rotation, a swivel or partial rotation and an inversion may be detected via motion sensors 130 and interpreted as respective commands by motion gesture logic 137.

E-reading device 110 further includes gesture logic 119 to determine if motions are intentional and can be considered motion inputs for the device. For example, upon detecting a cyclical motion input, the gesture logic 119 may automatically perform an operation associated with a motion gesture. For example, if the multi-motion command gesture is performed twice within a certain pre-set or user-settable duration (e.g. if two shakes are performed within the span of a second) the user will be returned to the table of contents. Three shakes and the user will be returned to their library.

In another embodiment, the action is a swivel-and-return swivel; or partly-rotate and return-counter-rotate. One time cleans the screen up when there is a pop up window, settings menu, or highlighted portion on the screen, two times (within a set duration) and the reader is brought to their table of contents and finally, three gestures performed consecutively brings the reader to their library.

In some embodiments, input motions performed on e-reading device 110, including but not limited to a tilt, a shake, a rotation, a swivel or partial rotation and an inversion may be detected via motion sensors 130 and interpreted by motion gesture logic 137 to accomplish respective output operations for e-reading actions, such as turning a page (whether advancing or backwards), placing a bookmark on a given page or page portion, placing the e-reader device in a sleep state, a power-on state or a power-off state, and navigating from the e-book being read to access and display an e-library collection of e-books that may be associated with user account store 124.

FIG. 2 illustrates architecture, in one embodiment, of e-reading device 110 as described above with respect to FIG. 1. In one embodiment, the e-reading device provide a gesture input mode of operation whereby a user can use physical movement of the device to provide inputs that cause functionality of the device to be automatically implemented.

With reference to FIG. 2, e-reading device 110 further includes a processor 210, a memory 250 storing instructions and a rules data portion 299 that in one embodiment reside within memory 250 but in one embodiment, may reside in a standalone memory. Rules 299 can be configured to define sequences of motions related to motion commands.

The processor 210 can implement functionality using the logic and instructions stored in the memory 250. Additionally, in some implementations, the processor 210 utilizes the network interface 220 to communicate with the network service 120 (see FIG. 1). More specifically, the e-reading device 110 can access the network service 120 to receive various kinds of resources (e.g., digital content items such as e-books, configuration files, account information), as well as to provide information (e.g., user account information, service requests etc.). For example, e-reading device 110 can receive application resources 221, such as e-books or media files, that the user elects to purchase or otherwise download via the network service 120. The application resources 221 that are downloaded onto the e-reading device 110 can be stored in the memory 250.

In some implementations, the display 116 can correspond to, for example, a liquid crystal display (LCD) or light emitting diode (LED) display that illuminates in order to provide content generated from processor 210. In some implementations, the display 116 can be touch-sensitive. For example, in some embodiments, one or more of the touch sensor components 138 may be integrated with the display 116. In other embodiments, the touch sensor components 138 may be provided (e.g., as a layer) above or below the display 116 such that individual touch sensor components 116 track different regions of the display 116. Further, in some variations, the display 116 can correspond to an electronic paper type display, which mimics conventional paper in the manner in which content is displayed. Examples of such display technologies include electrophoretic displays, electrowetting displays, and electrofluidic displays.

The processor 210 can receive input from various sources, including the touch sensor components 138, the display 116, and/or other input mechanisms (e.g., buttons, keyboard, mouse, modules, microphone, etc.). With reference to examples described herein, the processor 210 can respond to input 231 detected at the touch sensor components 138. In some embodiments, the processor 210 responds to inputs 231 from the touch sensor components 138 and motion sensor components 130 in order to facilitate or enhance e-book activities such as generating e-book content on the display 116, performing page transitions of the displayed e-book content, powering off the device 110 and/or display 116, activating a screen saver, launching or closing an application, and/or otherwise altering a state of the display 116.

In some embodiments, the memory 250 may store display sensor logic 135 or motion gesture logic 119 that monitors for user interactions detected through the touch sensor components 138 and motion sensors 130, and further processes the user interactions as a particular input or type of input. In an alternative embodiment, the display sensor logic 135 may be integrated with the touch sensor components 138. For example, the touch sensor components 138 can be provided as a modular component that includes integrated circuits or other hardware logic, and such resources can provide some or all of the display sensor logic 135. In variations, some or all of the display sensor logic 135 may be implemented with the processor 210 (which utilizes instructions stored in the memory 250), or with an alternative processing resource.

The gesture logic 119 detects and correlates a particular gesture (e.g., movements of the device, pinching, swiping, tapping, etc.) as a particular type of input or user action. The gesture logic 119 may also detect directionality so as to distinguish between, for example, leftward or rightward movements.

Figure 3:
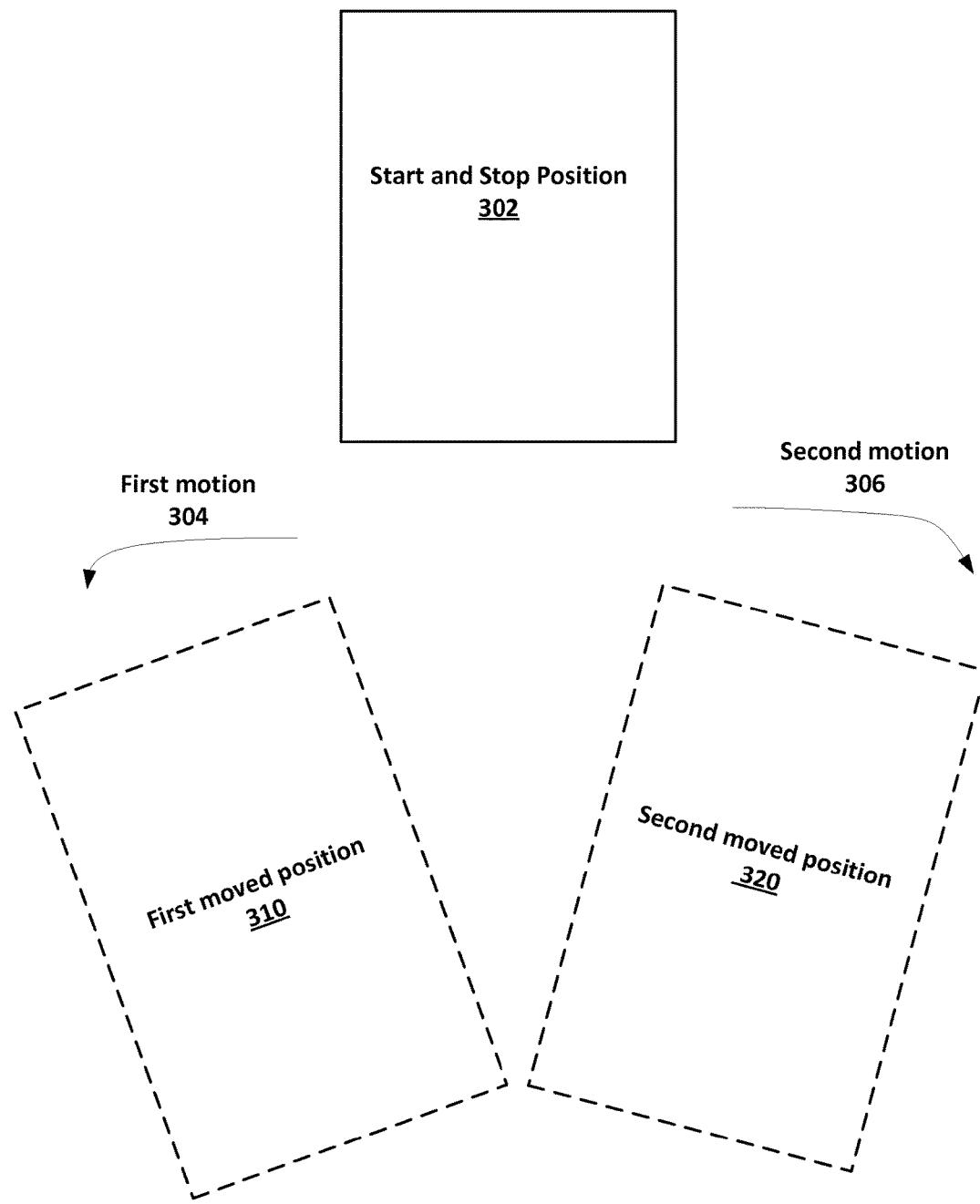
FIG. 3 illustrates an example configuration for a computing device operation for motion gesture, according to an embodiment.

FIG. 3 depicts movement of the electronic device that can be used as gesture input in accordance with an embodiment.

FIG. 3 shows device 110 in a start and stop position 302 which is the starting and ending position of the device.

For clarity, the first moved position 310 and second moved position 320 are illustrated with dotted lines and are shown below the start and stop position 302. However, it should be appreciated that the movement of the device can be performed without any vertical change in position. The movement shown in FIG. 3 is a simple rotation from left to right then back to center. It is appreciated that though the motions are shown in a two dimensional illustration, it is appreciated that the motions could be any motion in a three dimensional space that can be used in accordance with embodiments described herein. For example, in one embodiment, the motions could be a rotation coming out of the page of FIG. 3 and a rotation back into the page of FIG. 3.

A user moves the device 110 with a first motion 304 from the start position 302 to the first moved position 310 then moves the device with a second motion 306 to the second moved position 320 and then back to the start position 302. The first movement 304 and second movement 306 can be sensed by the motion sensors 130 and the motion gesture logic can intemperate these movements as a command if performed within a predetermined period of time. In one embodiment, the second motion is a counter motion of the first motion meaning that they are of similar movement, but in opposite directions.

In one embodiment, a threshold time period can be set to help filter erroneous movements that are not intended to be movement gesture commands. In one embodiment, rules 299 can be defined to establish movement gesture thresholds and in one embodiment, rules 299 can be customized to set up user specific movement gestures.

In one embodiment, the e-Reader described herein is configured for receiving at a motion sensor coupled with a processor a first motion 304 associated with an e-reader and configured for receiving a second motion 306 associated with an e-reader at the motion sensor, the second motion 306 being a counter motion of the first motion 304, wherein the first and second motions are associated with moving the e-reader form a first point in space 302 to a second point in space 304 to a third point in space 306 and then back to said first point in space 302 within a predetermined period of time.

In one embodiment, the device is configured for determining the first and second motions indicate a multi-motion command gesture corresponding to a first function performable on said e-Reader. In one embodiment, the e-Reader automatically performing this first function on the e-reader in response to the multi-motion command gesture.

In one embodiment, the first function includes returning from a current screen to a previous screen on said e-Reader. In this embodiment, the multi-movement gesture functions as a virtual "back" button and returns the reader to the previously viewed screen. In one embodiment, performing a return gesture once (e.g. a single shake up and down) can take readers from any in-book setting window (i.e. notation pop-up window, search pop-up window, highlighted text options) back to their reading experience mode, in which they were immersed before the diversion that got them out of the in-book setting.

In another embodiment, the first function includes returning from a current screen to a menu screen on the e-Reader. In this embodiment, the multi-movement gesture functions as a virtual "home" button and returns the reader to the home menu.

In one embodiment, the device is configured for determining the first motion 304 or the second motion 306 is an incomplete motion and when an incomplete motion is detected, the device filters the first motion 304 or the second motion 306 to prevent an erroneous command gesture from performing the first function.

In one embodiment, a motion gesture can be completed a plurality of times, each number of times implementing a different command function. For example, in one embodiment, the device is configured for receiving motion indicating the multi-motion command gesture is performed twice within a predetermined period of time and automatically performing a second function on the e-reader in response to receiving a motion gesture repeated twice.

In another example, the device is configured for receiving motion indicating the multi-motion command gesture is performed three times within the predetermined period of time and configured for automatically performing a third function on the e-reader in response to receiving a motion gesture repeated three times.

FIG. 4 illustrates an example method 400 implemented by processor 210 of computing device 110 for providing a multi-motion command gesture, according to an embodiment using elements such as described with prior examples, including those of FIGS. 1-3 herein.

At step 402, method 400 includes receiving at a motion sensor 130 coupled with a processor 210 a first motion 304 associated with an e-reader.

At step 404, method 400 includes receiving a second motion 306 associated with an e-reader at the motion sensor 130, said second motion 306 being a counter motion of the first motion 304, wherein the first and second motions are associated with moving the e-reader 110 form a first point in space 302 to a second point in space 310 to a third point in space 320 and then back to the first point in space 302 within a predetermined period of time.

At step 406, method 400 includes determining the first and second motions indicate a multi-motion command gesture corresponding to a first function performable on the e-Reader.

At step 408, method 400 includes automatically performing the first function on the e-reader in response to the multi-motion command gesture.

In one embodiment, the first function includes returning from a current screen to a previous screen on the e-Reader. In another embodiment, the first function includes returning from a current screen to a menu screen on the e-Reader.

In one embodiment, method 400 also includes determining the first motion or the second motion is an incomplete motion and includes filtering the first motion or the second motion to prevent an erroneous command gesture from performing the first function.

In one embodiment, the first and second motions correspond to shaking the e-Reader from the first point in space to the second point in space and then back to the first point in space.

In one embodiment, the first and second motions correspond to rotating the e-Reader from the first point in space to the second point in space and then back to the first point in space.

In one embodiment, method 400 includes receiving motion indicating the multi-motion command gesture is performed twice within a predetermined period of time and automatically performing a second function on the e-reader.

In one embodiment, method 400 includes receiving motion indicating the multi-motion command gesture is performed three times within the predetermined period of time and automatically performing a third function on the e-reader.

Example Computer System Environment

Figure 5:
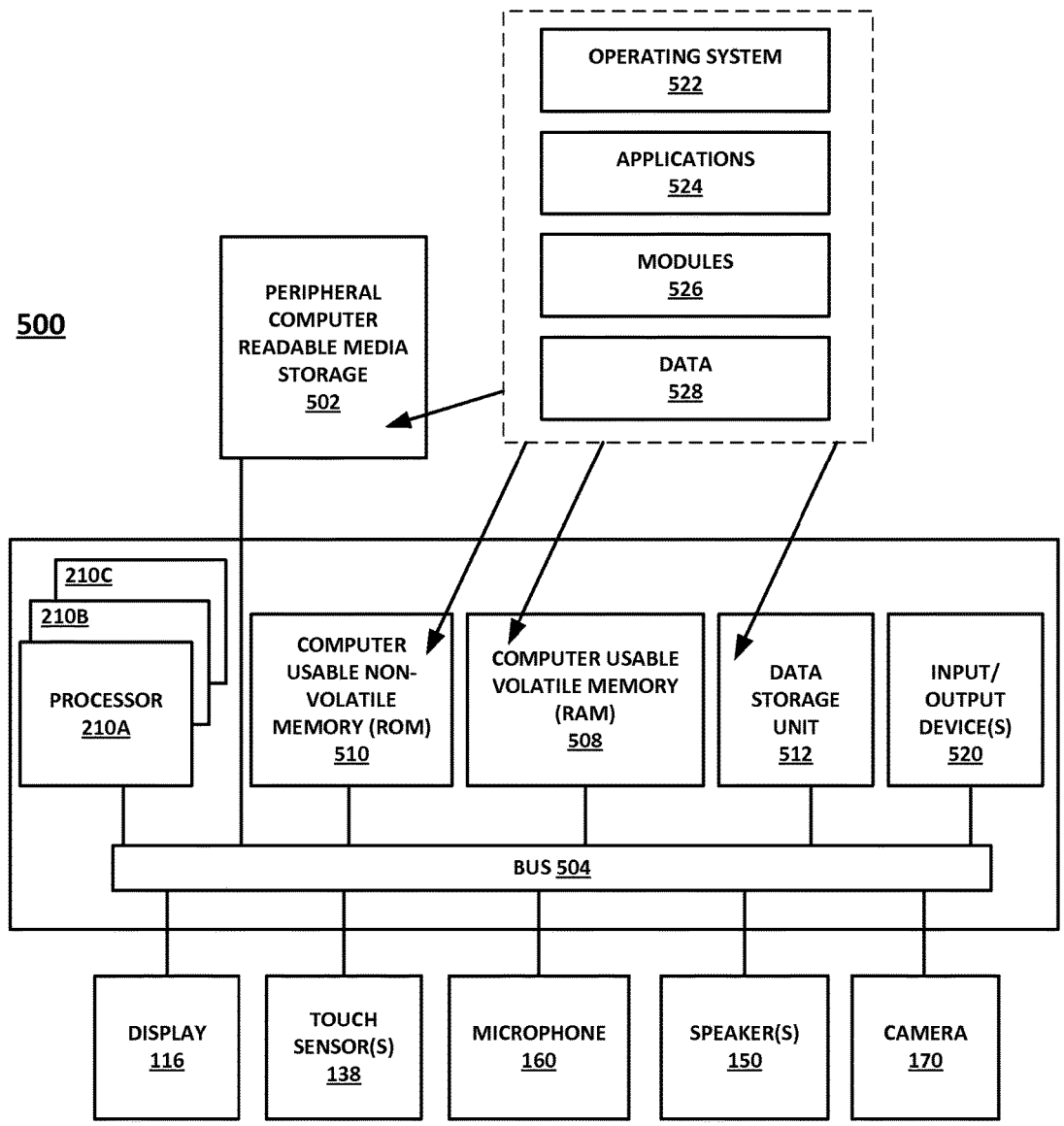
FIG. 5 illustrates a computer system for performing a motion gesture operation, according to an embodiment.

With reference now to FIG. 5, all or portions of some embodiments described herein are composed of computer-readable and computer-executable instructions that reside, for example, in computer-usable/computer-readable storage media of a computer system. That is, FIG. 5 illustrates one example of a type of computer (computer system 500) that can be used in accordance with or to implement various embodiments of an e-Reader, such as e-Reader 100, which are discussed herein. It is appreciated that computer system 500 of FIG. 5 is only an example and that embodiments as described herein can operate on or within a number of different computer systems.

System 500 of FIG. 5 includes an address/data bus 504 for communicating information, and a processor 210A coupled to bus 504 for processing information and instructions. As depicted in FIG. 5, system 500 is also well suited to a multi-processor environment in which a plurality of processors 210A, 210B, and 210C are present. Processors 210A, 210B, and 210C may be any of various types of microprocessors. For example, in some multi-processor embodiments, one of the multiple processors may be a touch sensing processor and/or one of the processors may be a display processor. Conversely, system 500 is also well suited to having a single processor such as, for example, processor 210A.

System 500 also includes data storage features such as a computer usable volatile memory 508, e.g., random access memory (RAM), coupled to bus 504 for storing information and instructions for processors 210A, 210B, and 210C. System 500 also includes computer usable non-volatile memory 510, e.g., read only memory (ROM), coupled to bus 504 for storing static information and instructions for processors 210A, 210B, and 210C. Also present in system 500 is a data storage unit 512 (e.g., a magnetic or optical disk and disk drive) coupled to bus 504 for storing information and instructions.

Computer system 500 of FIG. 5 is well adapted to having peripheral computer-readable storage media 502 such as, for example, a floppy disk, a compact disc, digital versatile disc, universal serial bus "flash" drive, removable memory card, and the like coupled thereto. In some embodiments, computer-readable storage media 502 may be coupled with computer system 500 (e.g., to bus 504) by insertion into removable a storage media slot.

System 500 also includes or couples with display 116 for visibly displaying information such as alphanumeric text and graphic images. In some embodiments, system 500 also includes or couples with one or more optional touch sensors 138 for communicating information, cursor control, gesture input, command selection, and/or other user input to processor 210A or one or more of the processors in a multi-processor embodiment. In some embodiments, system 500 also includes or couples with one or more optional speakers 150 for emitting audio output. In some embodiments, system 500 also includes or couples with an optional microphone 160 for receiving/capturing audio inputs. In some embodiments, system 500 also includes or couples with an optional digital camera 170 for receiving/capturing digital images as an input.

Optional touch sensor(s) 230 allows a user of computer system 500 (e.g., a user of an eReader of which computer system 500 is a part) to dynamically signal the movement of a visible symbol (cursor) on display 116 and indicate user selections of selectable items displayed. In some embodiment other implementations of a cursor control device and/or user input device may also be included to provide input to computer system 500, a variety of these are well known and include: trackballs, keypads, directional keys, and the like.

System 500 is also well suited to having a cursor directed or user input received by other means such as, for example, voice commands received via microphone 160. System 500 also includes an input/output (I/O) device 520 for coupling system 500 with external entities. For example, in one embodiment, I/O device 520 is a modem for enabling wired communications or modem and radio for enabling wireless communications between system 500 and an external device and/or external network such as, but not limited to, the Internet. I/O device 520 may include a short-range wireless radio such as a Bluetooth® radio, Wi-Fi radio (e.g., a radio compliant with Institute of Electrical and Electronics Engineers' (IEEE) 802.11 standards), or the like.

Referring still to FIG. 5, various other components are depicted for system 500. Specifically, when present, an operating system 522, applications 524, modules 526, and/or data 528 are shown as typically residing in one or some combination of computer usable volatile memory 408 (e.g., RAM), computer usable non-volatile memory 510 (e.g., ROM), and data storage unit 512. For example, modules 526 may include various application modules such as a receiving module for a first motion associated with an e-reader and for receiving a second motion associated with an e-reader at the motion sensor, the second motion being a counter motion of said first motion. The application modules may also be configured for determining the first and second motions indicate a multi-motion command gesture corresponding to a first function performable on the e-Reader and for automatically performing the first function on the e-reader in response to the multi-motion command gesture.

In some embodiments, all or portions of various embodiments described herein are stored, for example, as an application 524 and/or module 526 in memory locations within RAM 508, ROM 510, computer-readable storage media within data storage unit 512, peripheral computer-readable storage media 502, and/or other tangible computer readable storage media.

Although illustrative embodiments have been described in detail herein with reference to the accompanying drawings, variations to specific embodiments and details are encompassed by this disclosure. It is intended that the scope of embodiments described herein be defined by claims and their equivalents. Furthermore, it is contemplated that a particular feature described, either individually or as part of an embodiment, can be combined with other individually described features, or parts of other embodiments.

What is claimed is:

1. A method executed in a processor of a computing device, the computing device further including a memory storing instructions and a display screen having touch functionality, the method comprising:
   receiving at a motion sensor coupled with said processor a first motion associated with an e-reader;
   receiving a second motion associated with said e-reader at said motion sensor, said second motion being a counter motion of said first motion;
   wherein said first and second motions are associated with moving said e-reader form a first point in space to a second point in space to a third point in space and then back to said first point in space within a predetermined period of time;
   determining said first and second motions indicate a multi-motion command gesture corresponding to a first function performable on said e-reader; and
   automatically performing said first function on said e-reader in response to said multi-motion command gesture.

2. The method of claim 1 wherein said first function includes returning from a current screen to a previous screen on said e-reader.

3. The method of claim 1 wherein said first function includes returning from a current screen to a menu screen on said e-reader.

4. The method of claim 1 further comprising:
   determining said first motion or said second motion is an incomplete motion; and
   filtering said first motion or said second motion to prevent an erroneous command gesture from performing said first function.

5. The method of claim 1 wherein said first and second motions correspond to shaking said e-reader from said first point in space to said second point in space and then back to said first point in space.

6. The method of claim 1 wherein said first and second motions correspond to rotating said e-reader from said first point in space to said second point in space and then back to said first point in space.

7. The method of claim 1 further comprising:
   receiving motion indicating said multi-motion command gesture is performed twice within a predetermined period of time; and
   automatically performing a second function on said e-reader.

8. The method of claim 7 further comprising:
   receiving motion indicating said multi-motion command gesture is performed three times within said predetermined period of time; and
   automatically performing a third function on said e-reader.

9. A non-transitory computer-readable medium that stores instructions for a computing device, the computing device including a processor, a memory and a display screen having touch functionality, the instructions being executable by the processor to cause the computing device to perform operations that include:
   receiving at a motion sensor coupled with said processor a first motion associated with an e-reader;
   receiving a second motion associated with said e-reader at said motion sensor, said second motion being a counter motion of said first motion;
   wherein said first and second motions are associated with moving said e-reader form a first point in space to a second point in space to a third point in space and then back to said first point in space within a predetermined period of time;
   determining said first and second motions indicate a multi-motion command gesture corresponding to a first function performable on said e-reader; and
   automatically performing said first function on said e-reader in response to said multi-motion command gesture.

10. The non-transitory computer-readable medium of claim 9 wherein said first function includes returning from a current screen to a previous screen on said e-reader.

11. The non-transitory computer-readable medium of claim 9 wherein said first function includes returning from a current screen to a menu screen on said e-reader.

12. The non-transitory computer-readable medium of claim 9 wherein said operations further include:
   determining said first motion or said second motion is an incomplete motion; and
   filtering said first motion or said second motion to prevent an erroneous command gesture from performing said first function.

13. The non-transitory computer-readable medium of claim 9 wherein said first and second motions correspond to shaking said e-reader from said first point in space to said second point in space and then back to said first point in space.

14. The non-transitory computer-readable medium of claim 9 wherein said first and second motions correspond to rotating said e-reader from said first point in space to said second point in space and then back to said first point in space.

15. The non-transitory computer-readable medium of claim 9 wherein said operations further include:
   receiving motion indicating said multi-motion command gesture is performed twice within a predetermined period of time; and
   automatically performing a second function on said e-reader.

16. The non-transitory computer-readable medium of claim 15 wherein said operations further include:
   receiving motion indicating said multi-motion command gesture is performed three times within said predetermined period of time; and
   automatically performing a third function on said e-reader.

17. A computing device comprising:
   a memory that stores a set of instructions;
   a display screen having touch functionality;
   a processor that access the instructions in memory, the processor configured to:
      receive at a motion sensor coupled with said processor a first motion associated with an e-reader;
      receive a second motion associated with said e-reader at said motion sensor, said second motion being a counter motion of said first motion;
      wherein said first and second motions are associated with moving said e-reader form a first point in space to a second point in space to a third point in space and then back to said first point in space within a predetermined period of time;
      determine said first and second motions indicate a multi-motion command gesture corresponding to a first function performable on said e-reader; and
      automatically perform said first function on said e-reader in response to said multi-motion command gesture.

18. The computing device of claim 17 wherein said first function includes returning from a current screen to a previous screen on said e-reader.

19. The computing device of claim 17 wherein said first function includes returning from a current screen to a menu screen on said e-reader.

20. The computing device of claim 17 wherein said processor is further configured to:
   determine said first motion or said second motion is an incomplete motion; and
   filter said first motion or said second motion to prevent an erroneous command gesture from performing said first function.

21. The computing device of claim 17 wherein said first and second motions correspond to shaking said e-reader from said first point in space to said second point in space and then back to said first point in space.

22. The computing device of claim 17 wherein said first and second motions correspond to rotating said e-reader from said first point in space to said second point in space and then back to said first point in space.

23. The computing device of claim 17 wherein said processor is further configured to
   receive motion indicating said multi-motion command gesture is performed twice within a predetermined period of time; and
   automatically perform a second function on said e-reader.

24. The computing device of claim 23 wherein said processor is further configured to
   receive motion indicating said multi-motion command gesture is performed three times within said predetermined period of time; and
   automatically perform a third function on said e-reader.

* * * * *